(12) United States Patent
Peterman et al.

(10) Patent No.: US 7,581,467 B2
(45) Date of Patent: Sep. 1, 2009

(54) TRANSMISSION

(75) Inventors: Jeffrey Ivan Peterman, Fond du Lac, WI (US); Brian George Eck, Bemidji, MN (US); Karl Michael Leisenheimer, Bemidji, MN (US); Scott A. Sjovall, Westby, WI (US)

(73) Assignee: TEAM Industries, Inc., Bagley, MN (US)

( * ) Notice: Subject to any disclaimer, the term of this patent is extended or adjusted under 35 U.S.C. 154(b) by 351 days.

(21) Appl. No.: 11/483,141

(22) Filed: Jul. 7, 2006

(65) Prior Publication Data

US 2007/0006673 A1 Jan. 11, 2007

Related U.S. Application Data

(60) Provisional application No. 60/698,108, filed on Jul. 11, 2005.

(51) Int. Cl.
*F16H 57/04* (2006.01)
*F16H 57/02* (2006.01)
*F16H 61/00* (2006.01)
*B60K 20/00* (2006.01)

(52) U.S. Cl. .................. 74/606 R; 74/473.37
(58) Field of Classification Search ........... 74/473.36, 74/473.37, 606 R
See application file for complete search history.

(56) References Cited

U.S. PATENT DOCUMENTS

| 4,233,857 | A | * | 11/1980 | Quick ............ 74/665 GA |
| 4,315,698 | A | * | 2/1982 | Takahashi et al. ......... 403/59 |
| 4,455,884 | A |   | 6/1984 | Tsuruta et al. |
| 4,475,638 | A | * | 10/1984 | McCormick ............ 192/218 |
| 4,693,129 | A | * | 9/1987 | Pierce ............... 74/333 |
| 6,155,125 | A |   | 12/2000 | Negherbon et al. |
| 6,216,550 | B1 | * | 4/2001 | Schwuger et al. ......... 74/339 |
| 6,308,797 | B1 |   | 10/2001 | Hacker et al. |
| 7,059,210 | B2 |   | 6/2006 | Thiessen et al. |
| 2006/0191363 | A1 | * | 8/2006 | Thiessen et al. ........... 74/325 |

FOREIGN PATENT DOCUMENTS

WO    WO 99/66229 A3    12/1999

OTHER PUBLICATIONS

VRSCA Model, 2002 Harley-Davidson® Parts Catalog, Official Factory Catalog—Part No. 99457-02, pp. 38-41 (Catalog dated 2002).

* cited by examiner

*Primary Examiner*—Tisha D Lewis
(74) *Attorney, Agent, or Firm*—IPLM Group, P.A.

(57) ABSTRACT

A motorcycle transmission (100) utilizes a shift fork (45), a shift collar (30) including a plurality of engagement teeth (30c) and a collar rib (30a) and a gear (34) (or one of the other six gears). The engagement teeth (30c) drive the teeth (34a) of the gear (34). A trap door (49), in combination with a threaded retainer (55), reduces axial play in shafts (37) and (75).

6 Claims, 14 Drawing Sheets

TRANSMISSION

The application claims priority from U.S. Provisional Patent Application Ser. No. 60/698,108, filed Jul. 11, 2005.

BACKGROUND OF THE INVENTION

1. Field of the Invention

This invention relates generally to a transmission and more particularly to a transmission utilizing a unique shift collar, shift fork and/or shift drum and/or a trap door.

2. Description of the Prior Art

Examples of other transmissions for motorcycles are found in U.S. Pat. Nos. 4,455,884, assigned to Honda and 6,308,797 assigned to Harley-Davidson Motor Company Group. The industry is constantly trying to address issues with existing designs and provide better solutions for areas that can be improved. For instance, for shifting mechanisms, better lubrication will assist in providing a better shifting mechanism. Reducing the weight of the shifting mechanism also leads to easier shifting. The present invention addresses these issues and provides for an improved shifting mechanism.

The engagement of the individual gears, as the transmission is shifted through the various gears is also an area that is of concern. The typical transmission will use a plurality of dogs and pockets to engage the gear. Mechanisms and methods for a smoother engagement are viewed as areas that can be improved upon to provide for a better motorcycle transmission.

Axial play of the shafts of a transmission need to be controlled. In the manufacturing of motorcycle transmissions, there is a tolerance stack up between bearing width, retaining ring width, and the depth of the bearing pocket to the location of the retaining ring groove. Excessive axial play on the main shaft can cause a motorcycle clutch to partially disengage during acceleration, causing the clutch to slip and possibly fail prematurely. Motorcycle transmissions that utilize spur gear designs do not generate an axial force like helical gears generate. Accordingly, for helical gears it is preferred to reduce axial shaft movement so as to achieve consistent clutch lever end play, which is a rider perception.

The present invention addresses these issues of prior art motorcycle transmissions.

SUMMARY OF THE INVENTION

In one embodiment the invention is a shift fork mechanism for a motorcycle transmission. The mechanism includes a shift collar having an outer surface. A ring protrudes from the outer surface and extends around the outer surface. A shift fork has a first end and a second end. The first end has a first groove and the second end has a second groove. The grooves are adapted and configured to mate with the ring, wherein lateral movement of the shift fork results in lateral movement of the shift collar.

In another embodiment, the invention is a gear and shift collar combination for a motorcycle transmission. The combination includes a shaft and at least a first gear and a second gear each having a hub. The hubs are rotatably mounted on the shaft. The hubs have a plurality of teeth operatively connected around the hub. A shift collar is mounted on the shaft for lateral movement thereon. The shift collar has an inner bore, the bore has a plurality of splines. The splines are adapted and configured to engage the hubs between the teeth of the hubs.

In another embodiment, the invention is a motorcycle transmission having a shaft mounted for rotation in a transmission housing. The shaft has a first end supported in the housing and a second end supported proximate a trap door. A plurality of gears are rotatably mounted on the shaft. A countershaft is mounted for rotation in the transmission housing, the countershaft has a first end supported in the housing and a second end supported proximate the trap door. A plurality of counter gears are rotatably mounted on the countershaft. The trap door has a cylindrical surface forming a bore. A flange is operatively connected to the trap door proximate a first end of the cylindrical surface, the flange defining a stop. A bearing has an inner race, an outer race, a first side and a second side. The bearing is positioned with a first side proximate the flange. A retainer has a threaded outer surface sized and configured to be connected to the cylindrical surfaces threaded surface, wherein when threaded, the retainer holds in place the outer race from the other side.

DETAILED DESCRIPTION OF A PREFERRED EMBODIMENT

The present invention is a motorcycle transmission, generally designated at 100. The invention can be used with any suitable transmission. For illustrative purposes, a suitable six-speed transmission is shown, it being understood that the present invention focuses on the utilization of one or more of shift forks 45, shift collars 30, shift sleeves 32 and shift drum 12 in combination with the gears of a suitable transmission. Also, a unique use of a trap door and retainer for reduction in axial play is disclosed. The following is a listing of a description of the components parts that may be utilized in a suitable transmission for use with the present invention.

| No. | Description |
|---|---|
| 1 | Screw |
| 2 | Screw |
| 3 | Washer |
| 4 | Cap |
| 5 | Hose fitting |
| 6 | Switch |
| 7 | Cover |
| 8 | Gasket |
| 9 | Screw |
| 10 | Washer |
| 11 | Carrier drum LH subassembly |
| 12 | Shift drum |
| 13 | Wave spring |
| 14 | Carrier drum RH subassembly |
| 15 | Retaining ring |
| 16 | Screw |
| 17 | Nut retainer |
| 18 | Hex Nut |
| 19 | Sprocket |
| 20 | Spacer |
| 21 | O-ring |
| 22 | Seal |
| 23 | Retaining ring |
| 24 | Ball bearing |
| 25 | Retaining ring |
| 26 | Washer |
| 27 | Seal |
| 28 | Transmission housing |
| 29 | Output shaft |
| 29a | $6^{th}$ gear |
| 30 | Shift collar |
| 31 | Retainer clip |
| 32 | Sleeve |
| 33 | Thrust washer |
| 34 | $5^{th}$ gear |
| 35 | Bearing |
| 36 | $2^{nd}$ gear |
| 37 | Main shaft |
| 37a | $1^{st}$ gear |
| 38 | $3^{rd}$ gear |
| 39 | $4^{th}$ gear |
| 40 | Spacer |
| 41 | Screw |
| 42 | Speed sensor cover |
| 43 | Speed sensor gasket |
| 44 | Trap door gasket |
| 45 | Fork 5-6 subassembly |
| 46 | Fork 1-2 subassembly |
| 47 | Fork 3-4 subassembly |
| 48 | Shift rail |
| 49 | Trap door |
| 50 | Washer |
| 51 | Screw |
| 52 | Screw |
| 53 | Bearing |
| 54 | Plug |
| 55 | Retainer |
| 56 | Nut |
| 57 | Clutch pushrod |
| 58 | Needle thrust bearing |
| 59 | Washer |
| 60 | Retaining external ring |
| 61 | Retaining internal ring |
| 62 | Pivot cable connector |
| 63 | Moveable ball ramp |
| 64 | Roller ball |
| 65 | Stationary ball ramp |
| 66 | Side cover gasket |
| 67 | Side cover |
| 68 | Dipstick subassembly |
| 69 | Screw |
| 70 | Screw |
| 71 | Plug |
| 72 | Torsion centering spring |
| 73 | Torsion pawl spring |
| 74 | Shifter weldment |
| 75 | Counter shaft |
| 75a | $6^{th}$ counter gear |
| 76 | $5^{th}$ counter gear |
| 77 | $2^{nd}$ counter gear |
| 78 | $1^{st}$ counter gear |
| 79 | $3^{rd}$ counter gear |
| 80 | $4^{th}$ counter gear |
| 81 | Bearing |

Figure 1:
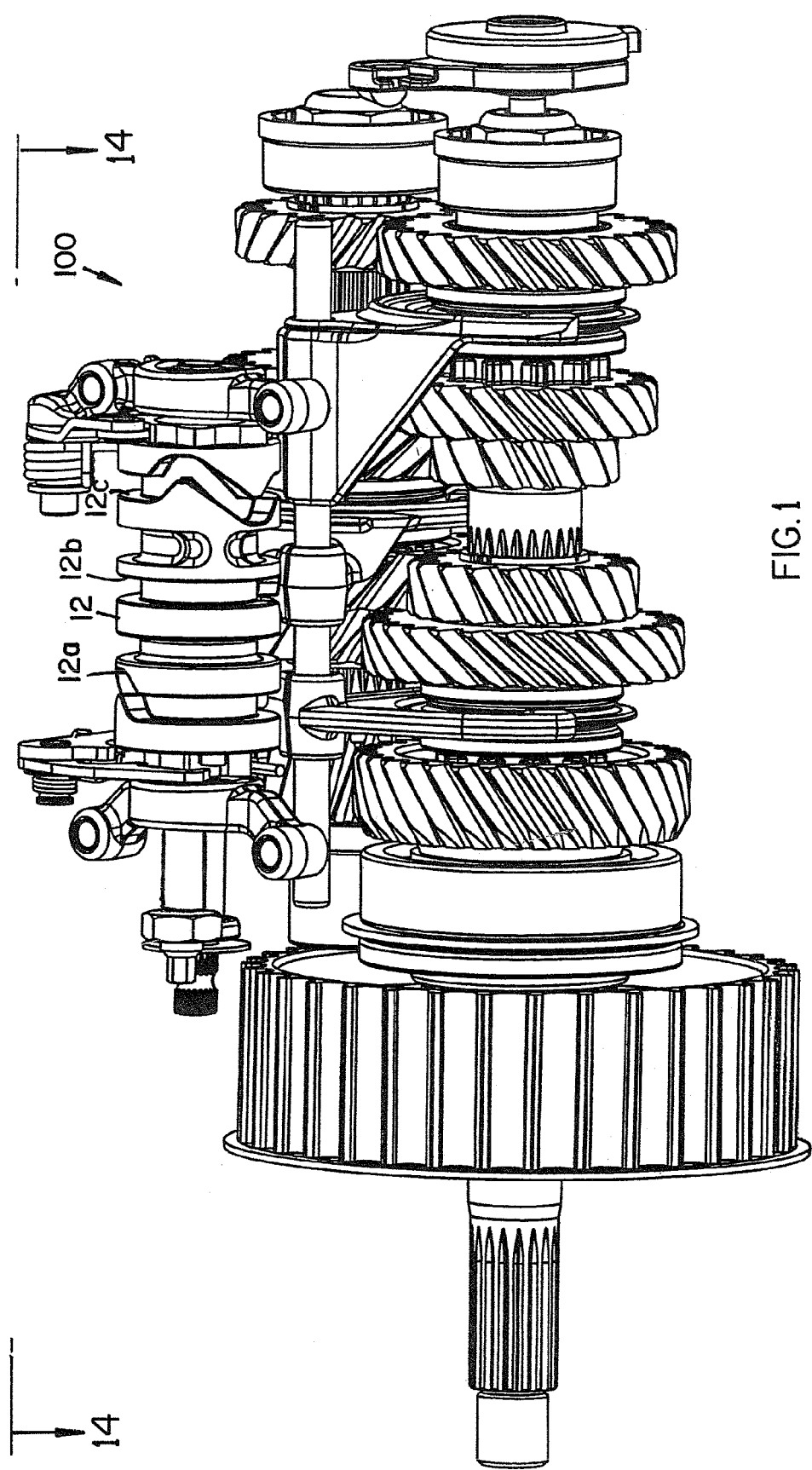
FIG. 1 is a perspective view of a transmission according to the principles of the present invention, with the outer housing removed.
Figure 2:
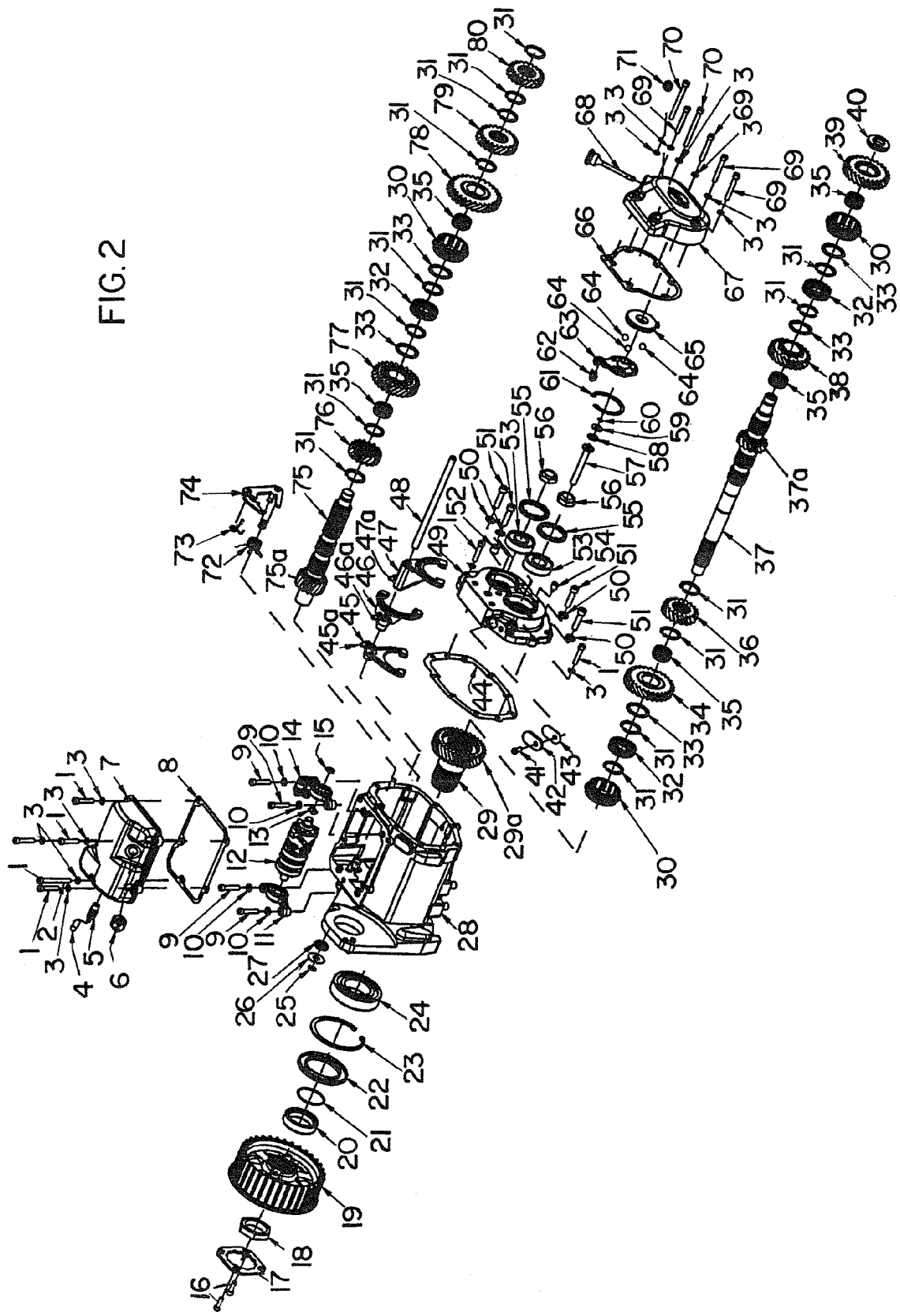
FIG. 2 is an exploded perspective view of the transmission shown in FIG. 1.
Figure 3:
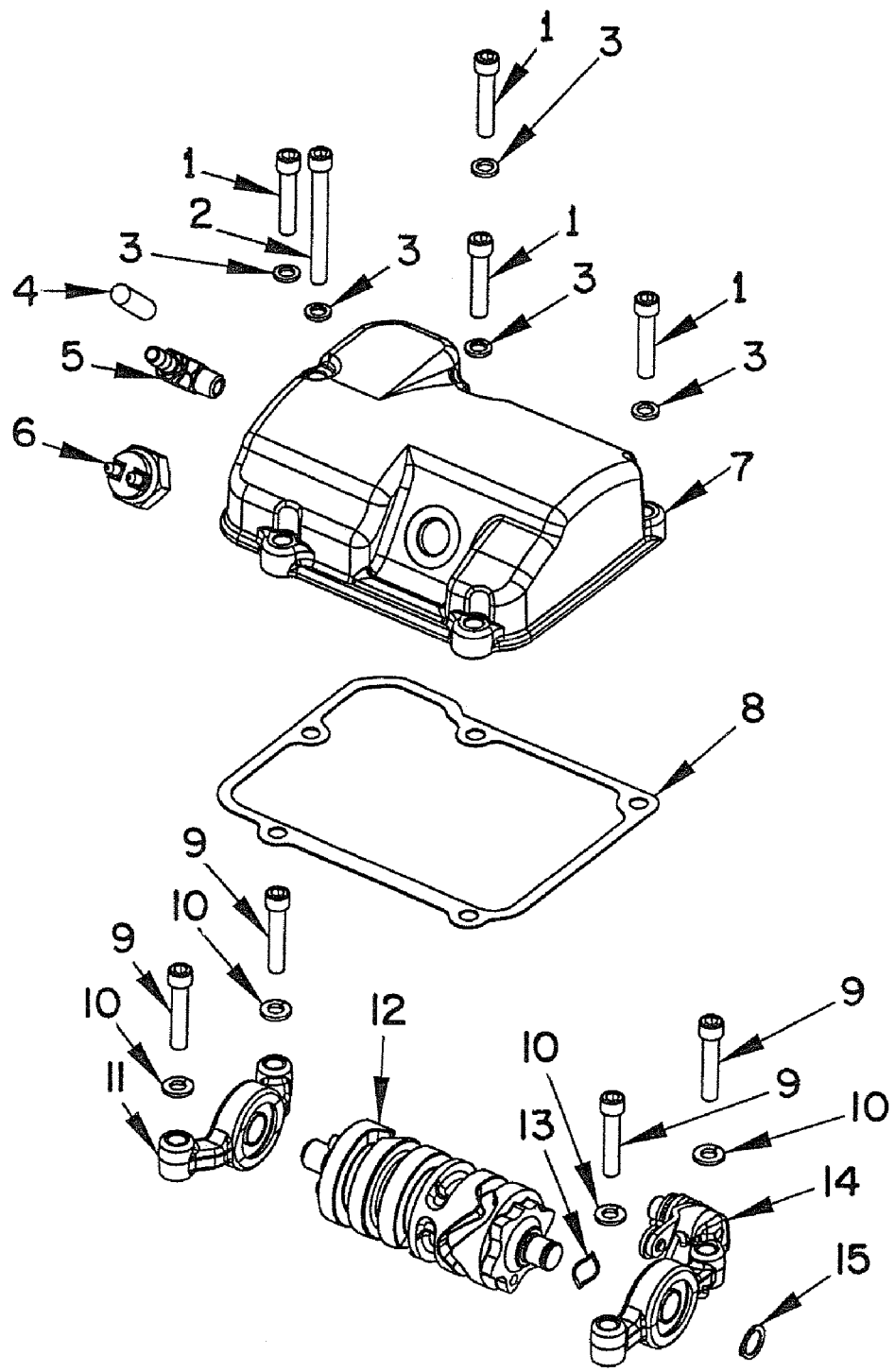
FIG. 3 is an enlarged perspective view of a portion of FIG. 2.
Figure 4:
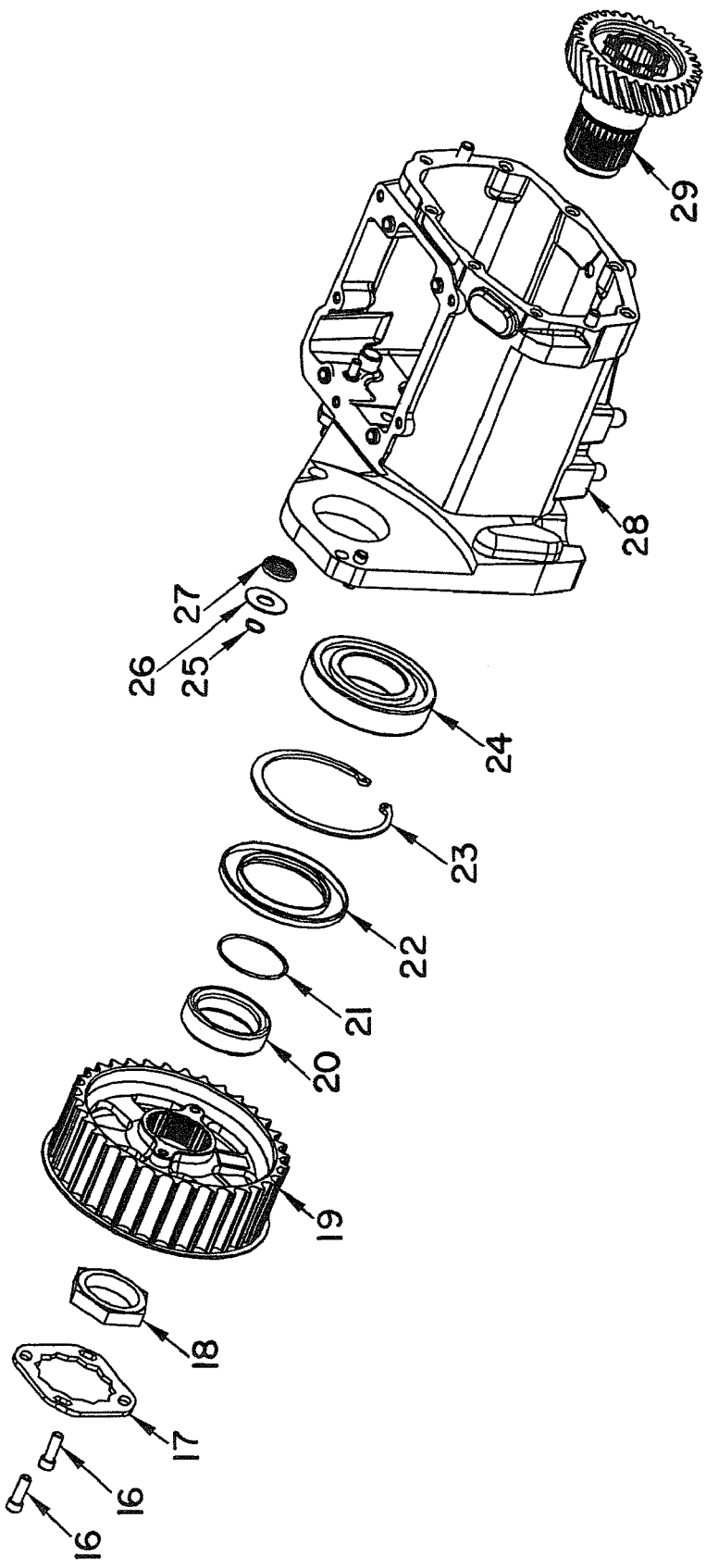
FIG. 4 is an enlarged perspective view of a portion of FIG. 2.

The manufacturing of a typical motorcycle transmission is well-known. The present inventions may be utilized with a number of suitable transmissions. The present application shows an assembled transmission 100 in FIG. 1. FIG. 2 shows an exploded perspective view of the transmission 100. Then, in FIGS. 3-7 enlarged portions of FIG. 2 are shown to more easily identify the respective parts. However, the present inventions are not directed solely to this type of transmission and since general transmission manufacturing is well known in the art, these figures will not be referred to in detail. Further, while a six gear transmission is shown, it is understood the present invention could be utilized with transmissions having more or less gears. Instead, some of the more detailed drawings that represent the present inventions are shown in more detail in FIGS. 8-15 and these figures will be described in detail, with reference to the other figures, when necessary to appreciate the utilization in a suitable motorcycle transmission.

The shift drum 12 has three cam tracks 12a-12c. The cam tracks 12a-12c provide a mechanism for moving the three shift forks 45-47 between the respective gears. Shift fork 45 is moveable between the fifth and sixth gears, shift fork 46 is moveable between the first and second gears, and shift fork 47 is moveable between the third and fourth gears. The shift forks 45-47 each have an extension 45a-47a that are positioned in the cam tracks 12a-12c, as is well known in the art. The shift drum 12 has 6 shift cylinders that are machined into and integral with the drum for shifting. There is one shorter cylinder 12d and five longer cylinders (one of which is hidden in FIG. 8) 12e-12h. The shifter weldment 74 includes a shift pawl 74a. The shorter cylinder 12d allows for the shift pawl 74a to sweep past first and sixth gears eliminating a hard-stop feel while still engaging anti-overrotation arms 74b and 74c. The spring 72 provides a biasing force for the anti-overrotation arms 74b and 74c and the spring 73 provides a biasing force for the shifter pawl 74a. The anti-overrotation arms 74b and 74c will contact one of the shift cylinders during shifting to ensure that only one gear upshift or downshift occurs, eliminating the possibility of multiple gear shifts occurring during a single upshift or downshift. If the short cylinder 12d is the same length as the other shift cylinders, you have the hard stop shift feel. It is possible to replace the short cylinder 12d with a bore in the drum 12. This would allow for a pin of varying lengths to be inserted that would allow the shift ending feel to be tuned to the individual operator preference.

Figure 8:
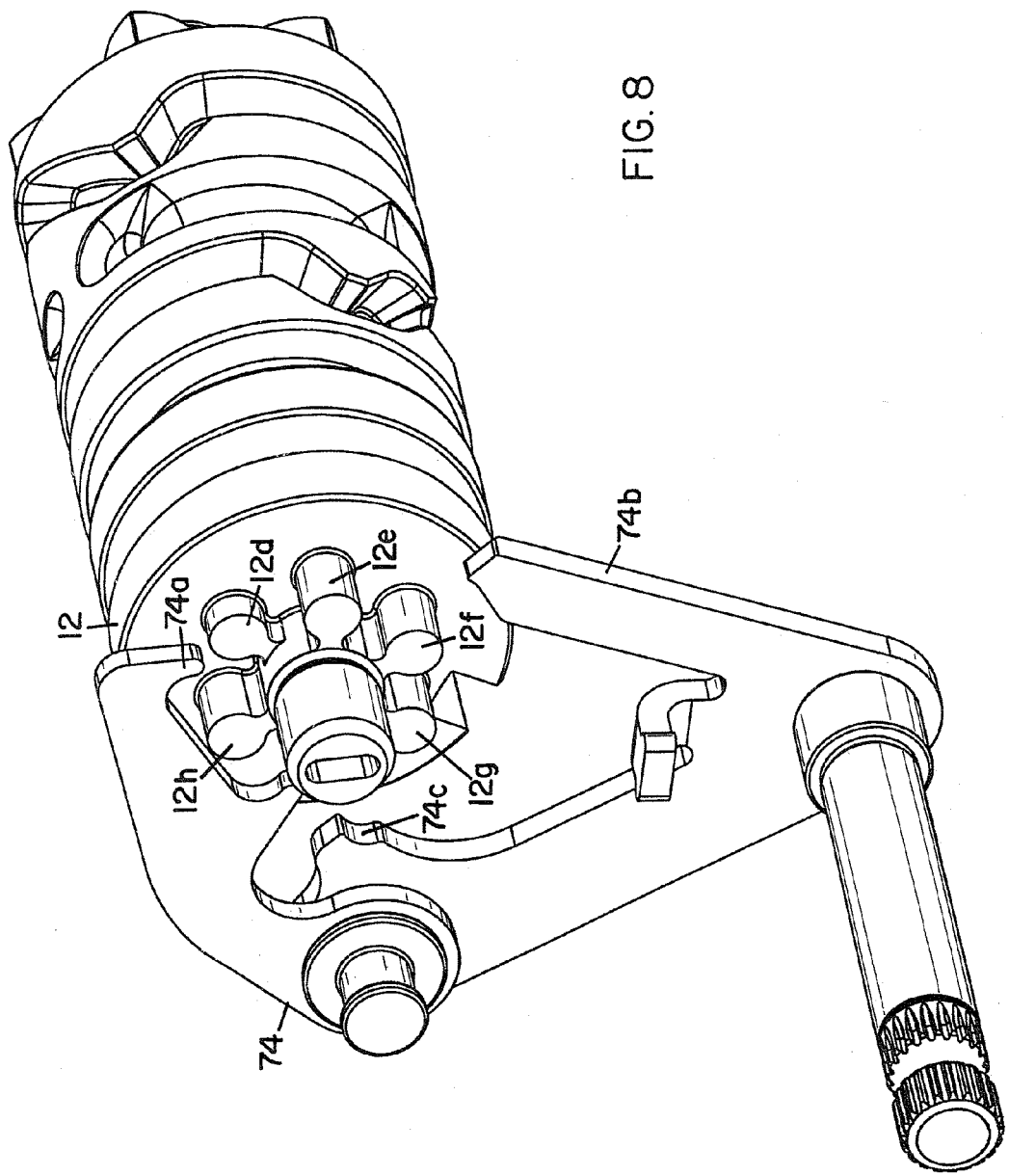
FIG. 8 is a perspective view of the shift fork and shift drum shown in FIG. 1.
Figure 9:
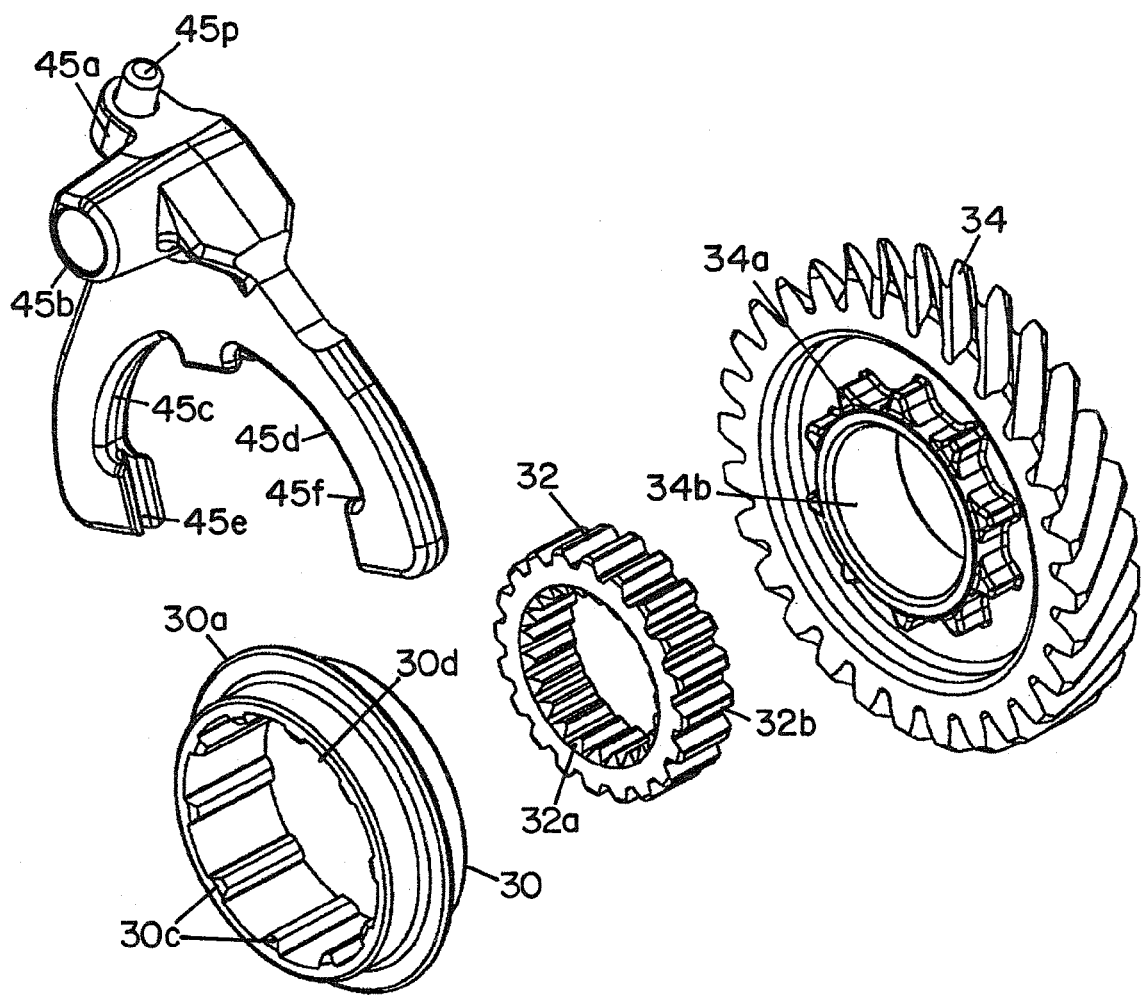
FIG. 9 is an exploded perspective view showing the shift collar, shift fork, one of the six transmission gears and a shift sleeve.
Figure 10:
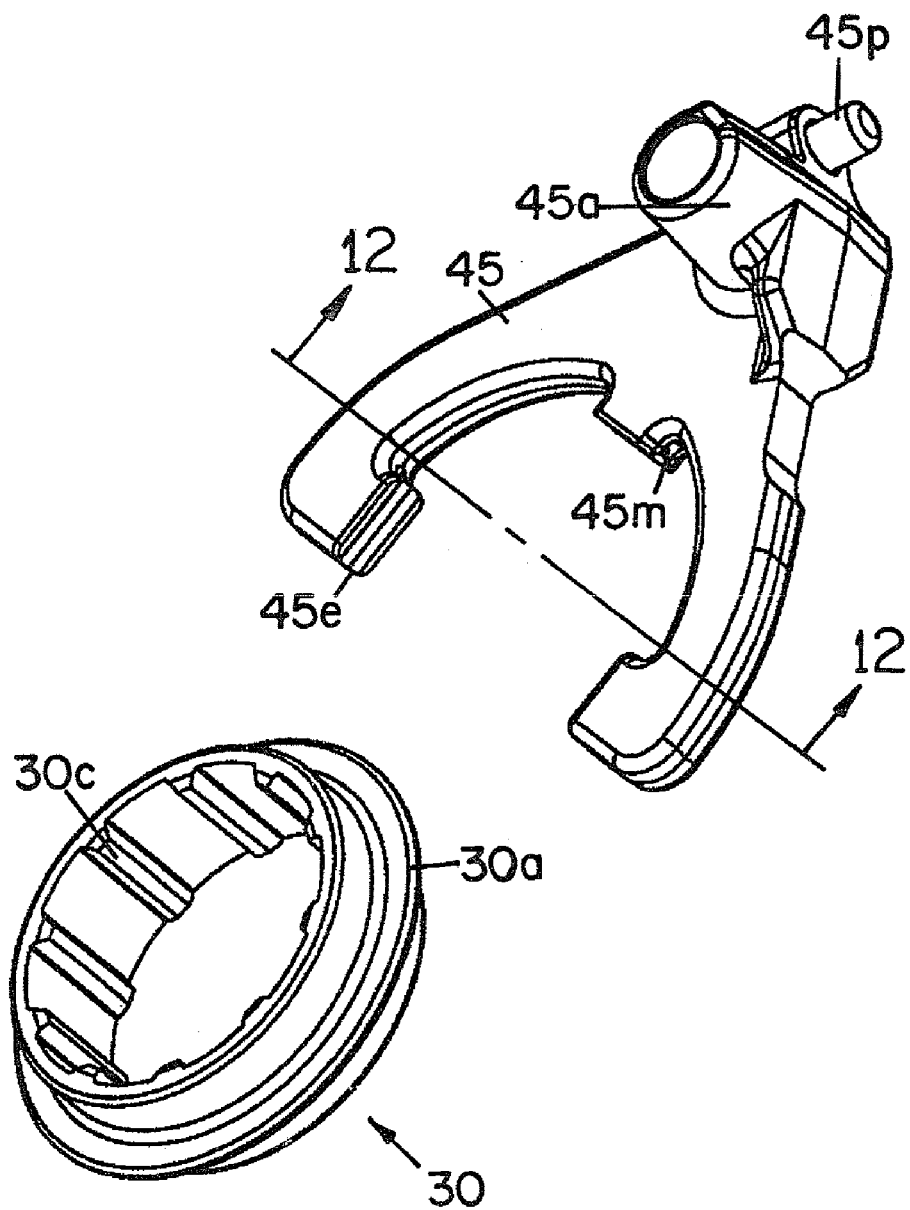
FIG. 10 is an enlarged view of the shift fork and shift collar shown in FIG. 9.
Figure 11:
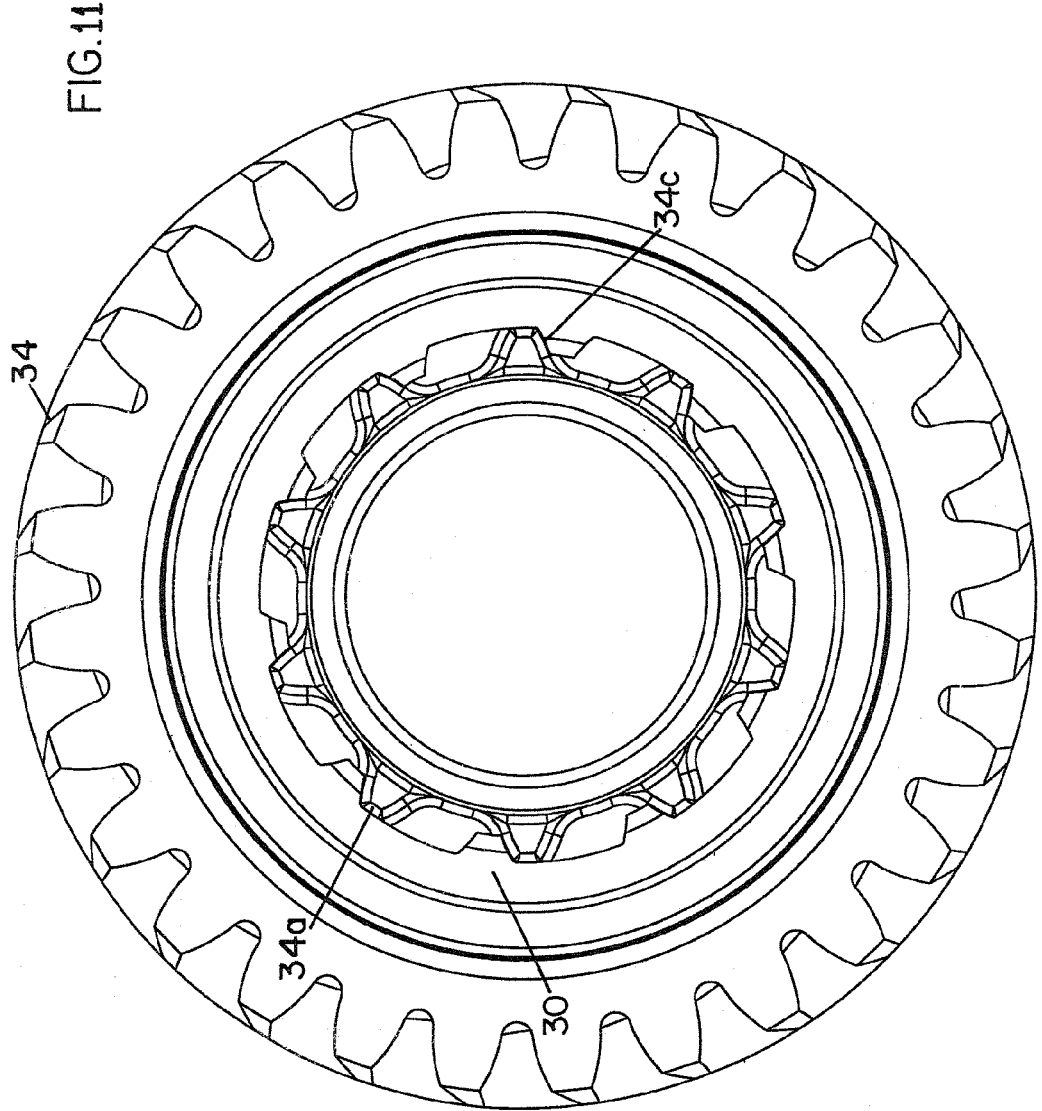
FIG. 11 is a side elevational view of the shift collar and gear shown in FIG. 9.
Figure 12:
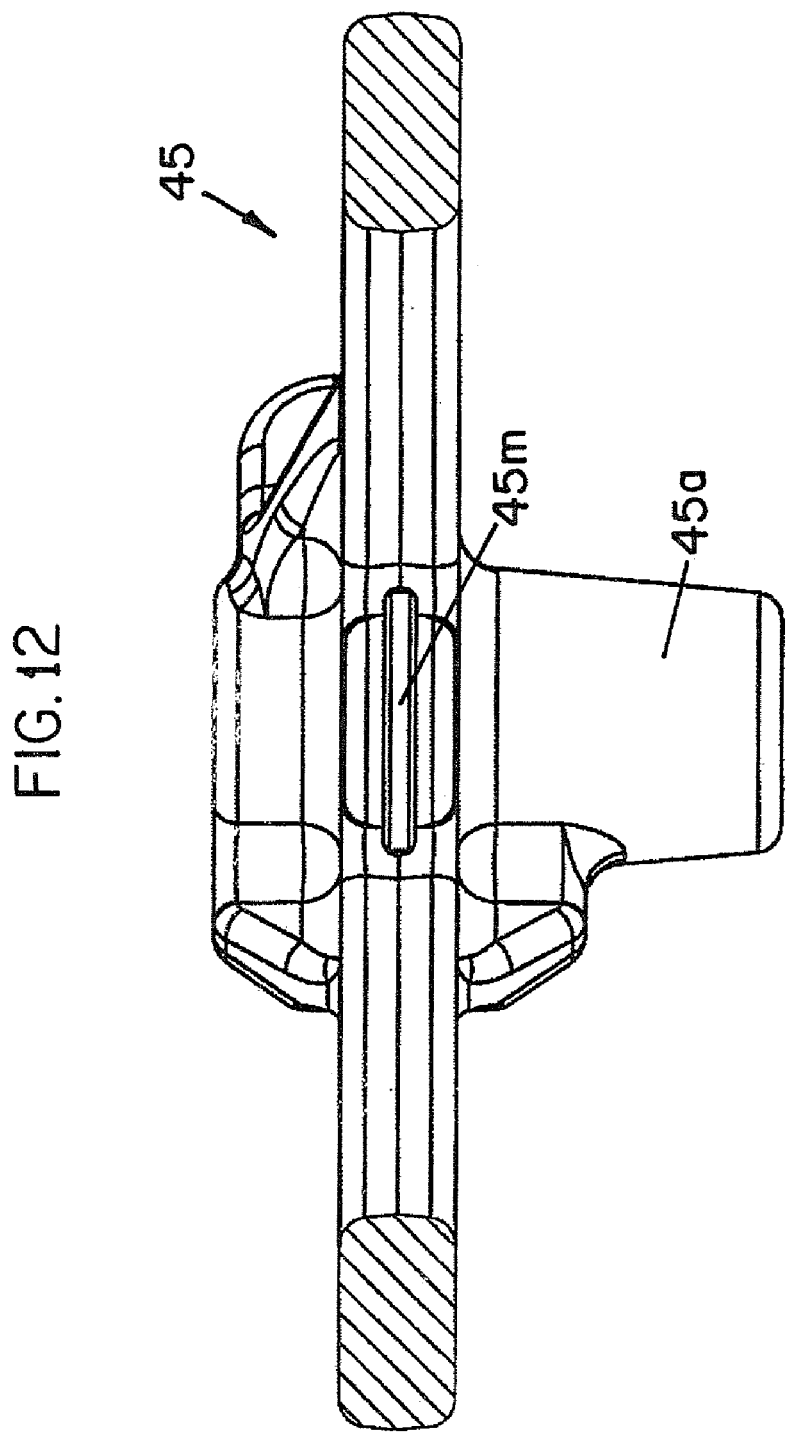
FIG. 12 is a cross-sectional view of the shift fork, taken generally along the lines 12-12 in FIG. 10.

Referring especially to FIGS. 8, 9 and 12, there is shown a shift fork 45 with a protrusion 45a. Shift forks 46 and 47 are similar, with a different structure for connecting the protrusions 46a, 47a. At the end of each protrusion is a pin 45p, 46p and 47p. The pins 45p, 46p and 47p are positioned in their respective cam track 12a-12c and provide for lateral movement of the shift fork as the shift drum 12 is rotated. The shift fork 45 includes a bore 45b, which is used for mounting the shift fork 45 on the shift rail 48. The shift fork 45 has a first leg 45c that is a mirror image of the second leg 45d. Each leg 45c, 45d has a groove or slot 45e, 45f formed therein to engage a rib 30a on the shift collar 30. The shift collar rib 30a will have oil splashed on it during rotation. The transmission housing 28 and side cover 67 provide a sealed cavity in which the transmission 100 operates in oil for lubrication. Midway between the ends of the forks is formed a middle groove or slot 45m. The groove 45m, similar to grooves 45e and 45f, is sized and configured to mate with the ring 30a. It is understood that groove may be continuous or the number of grooves may vary. Other transmissions typically will use a male shift fork with a female groove in the shift dog. Centrifugal force makes it more difficult to get oil into the bottom of a female groove versus splashed on a male rib 30a.

The three shift collars 30 engage one of the three pairs of gears in order to transmit power through the transmission. The shift collars 30 have a cylindrical support ring 30b that provides radial support for ten engagement splines 30c. The collars have a central bore 30d around which the engagement splines 30c are equally positioned. Other transmissions will typically use three to five cantilevered face dogs for engagement. The engagement splines 30c engage, by a sliding action, the corresponding ten engagement teeth 34a that are around a central hub 34b of the gear 34. The gears 29a, 34, 36, 37a, 38 and 39 are helical gears. This allows for lower backlash while trying to engage a particular gear. It also provides for a high aperture ratio (3:1) than current dog face designs (2:1 or less). The aperture ratio is the amount of space between the engagement splines 30c versus the tooth thickness of the engagement teeth 34a. The thin wall of the shift collar rib 30a allows for some distortion during shifting. This helps reduce the shift impact thus reducing shift noise and vibration. The involute contact profile 34c of the engagement teeth 34a lessens engagement noise versus a flat face dog engagement.

In the shift collar 30, the engagement splines 30c are splines and are used for back and forth movement and for engagement with the one of six gears. That is, the engagement splines 30c couples to the shaft as well as the gear. The shift sleeve 32 have inner splines 32a that tie the shift sleeve 32 to splines on shaft 37 (or shaft 75) and outer splines 32b that tie the shift sleeve 32 to the shift collar 30 through splines 30c. The engagement splines 30c are therefore always tied to the shift sleeve 32 and selectively to gear 34 or gear 29a.

As previously indicated, the first through sixth gears for the transmission 100 are helical gears as well as the counter gears. As such, the present invention is designed to limit excessive axial play on the shafts 37 and 75. Manufacturing tolerances of the bearing, and a retainer and the depth of the bearing pocket tend to stack up. The shafts 37 and 75 are positioned so that axial play is diminished by the present design.

Figure 5:
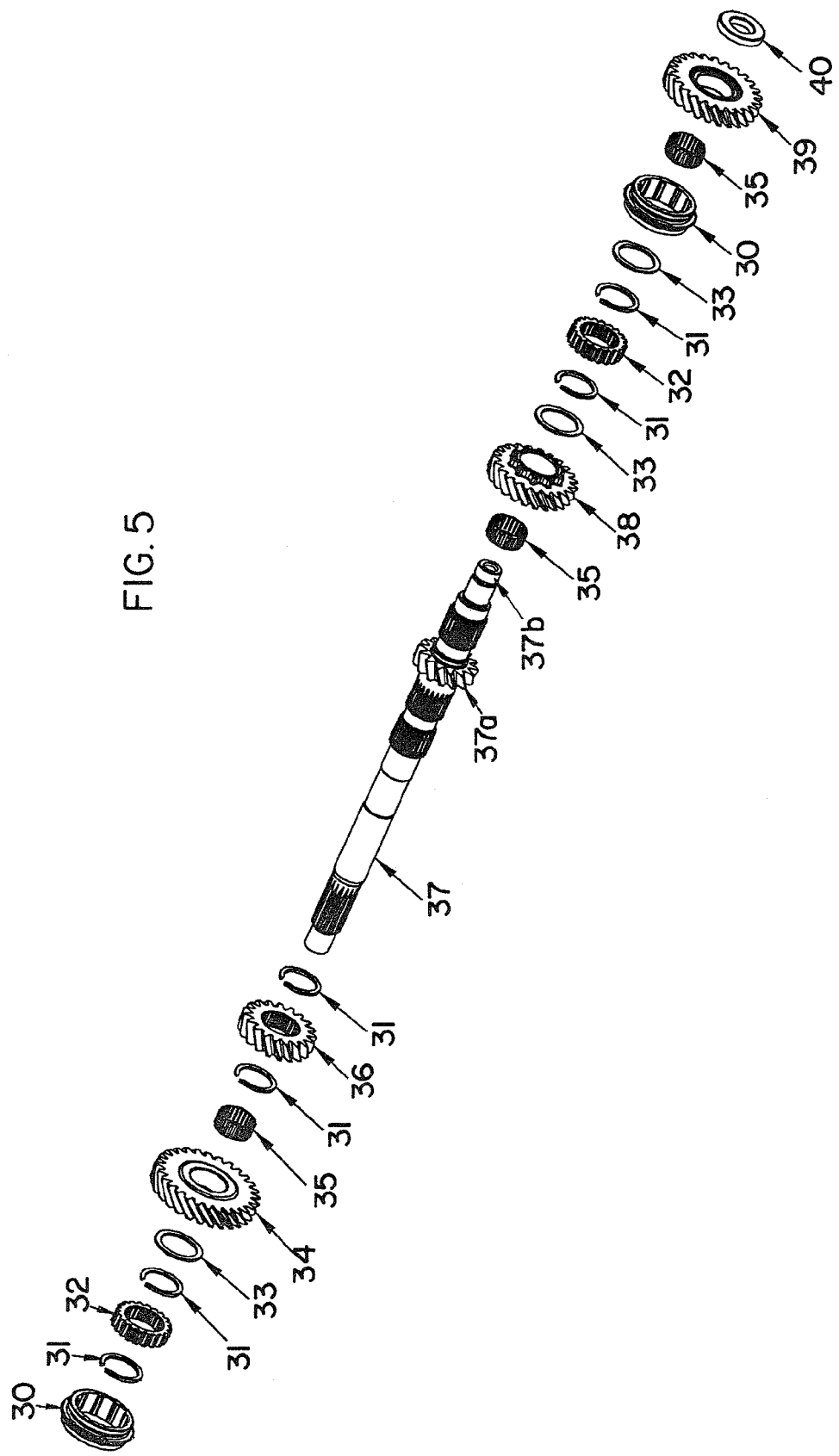
FIG. 5 is an enlarged perspective view of a portion of FIG. 2.
Figure 6:
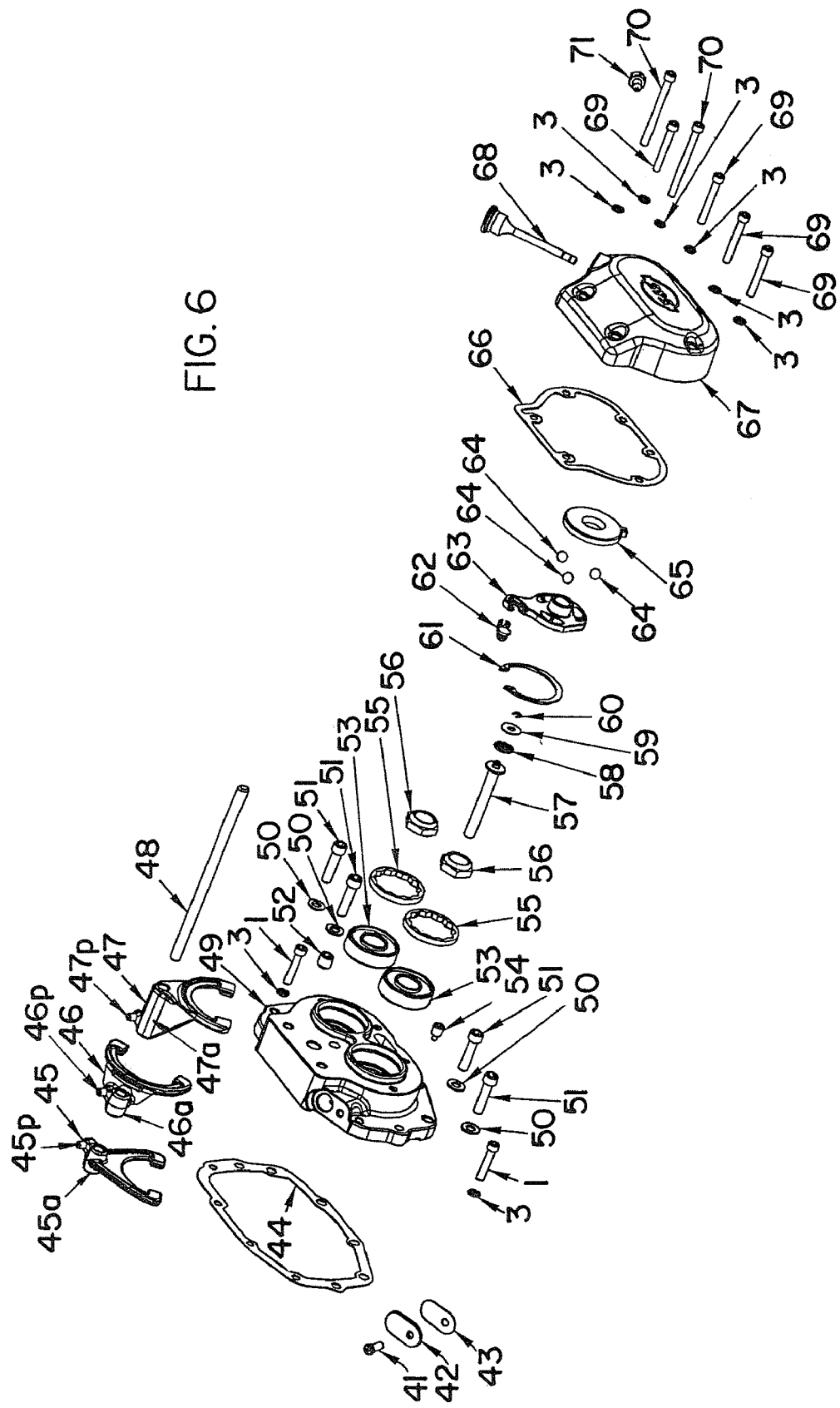
FIG. 6 is an enlarged perspective view of a portion of FIG. 2.
Figure 7:
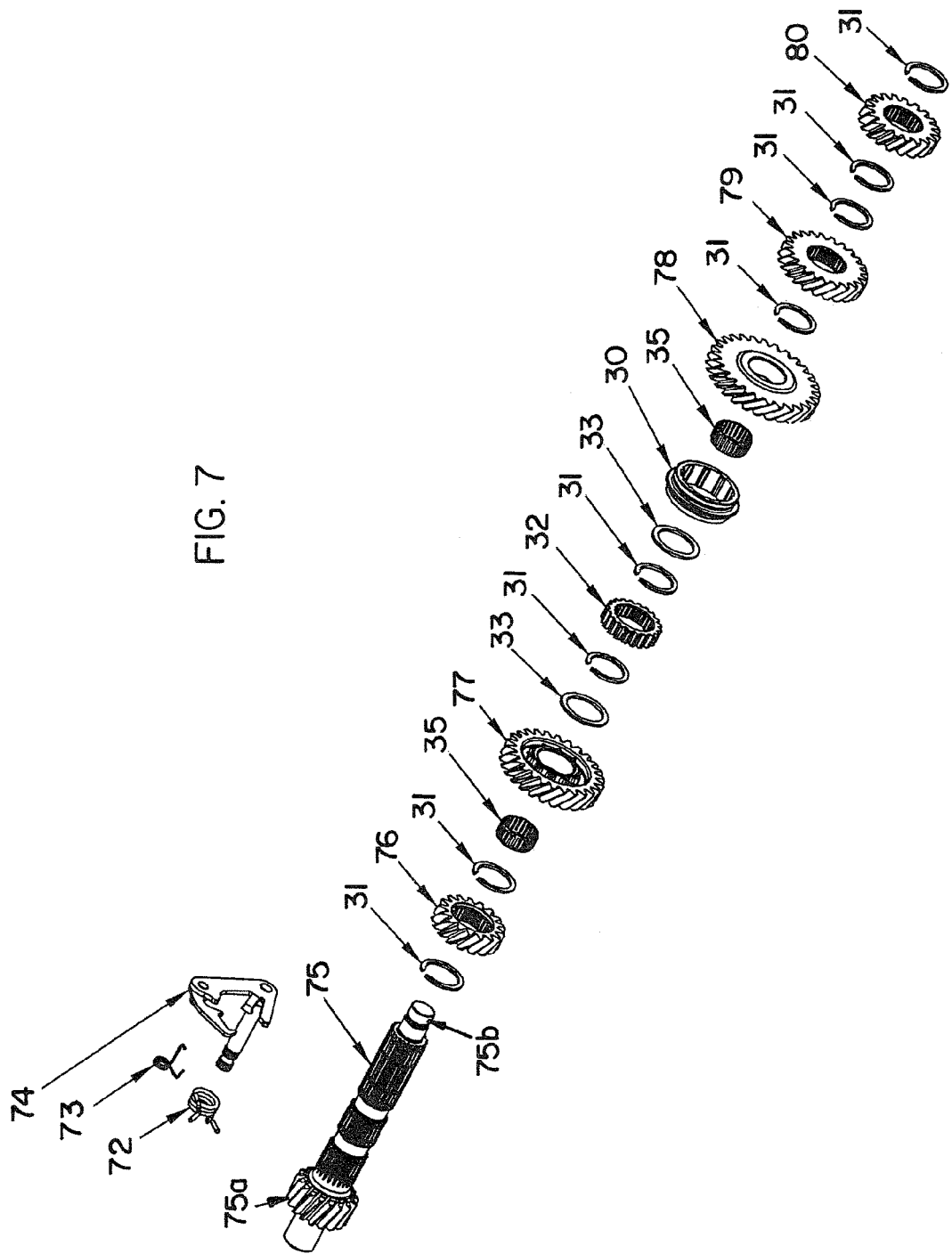
FIG. 7 is an enlarged perspective view of a portion of FIG. 2.
Figure 13:
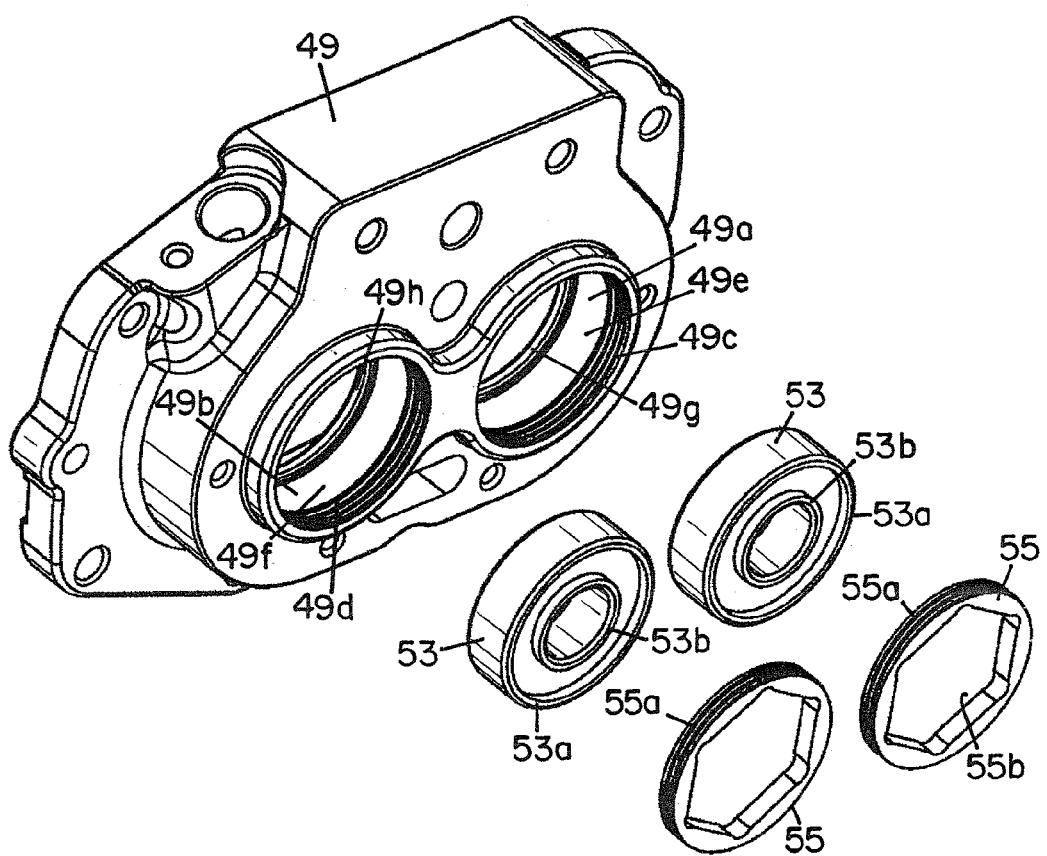
FIG. 13 is an enlarged exploded perspective view of a portion of the transmission shown in FIG. 2 proximate the trap door.
Figure 14:
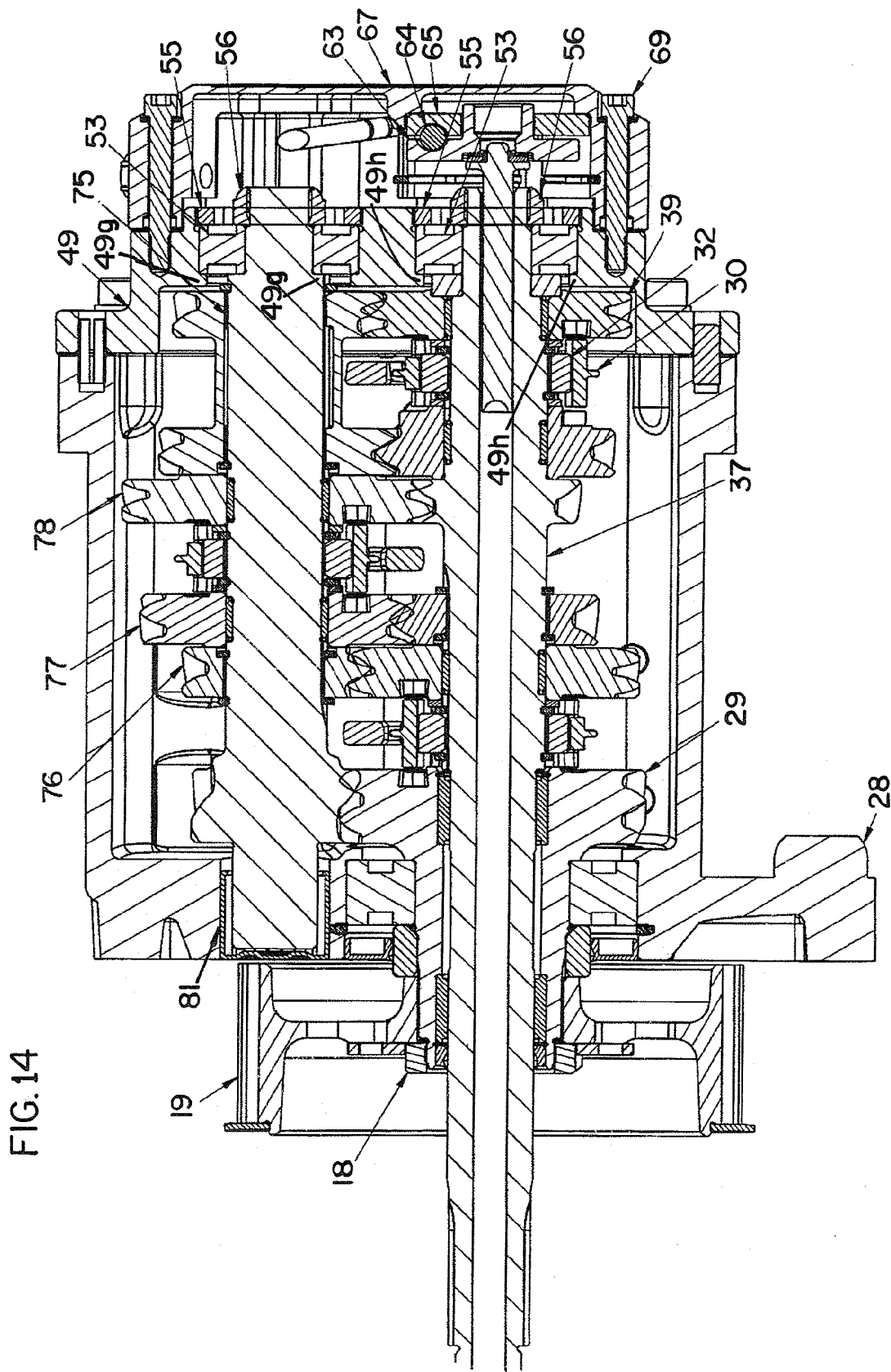
FIG. 14 is a cross-sectional view of the transmission shown in FIG. 1, taken generally along the lines 14-14.

Referring now especially to FIGS. 13 and 14, it is seen that the trap door 49 has two circular openings 49a and 49b. The openings 49a and 49b have thread surfaces 49c and 49d formed therein. Bearings 53 are positioned in their respective bearing pockets 49e and 49f. The bearings 53 are positioned with one side up against a flange 49g and 49h that is integral with the trap door 49 and forms a stop for the bearings 53. The bearings 53 have an outer race 53a and an inner race 53b. A retainer 55 has a threaded outer surface 55a that is sized and configured to be threaded onto the threaded surfaces 49c, 49d. The shafts 37 and 75 are positioned in the bearings 53. The bearings 53 are in the respective bearing pockets 49e and 49f. A nut 56 is sized to fit in the opening 55b, with enough clearance for a tool to be used to tighten the nut 56. The retainers 55 are threaded onto the threaded surfaces 49c and 49d. The nut 56 is threaded on the ends 37a and 75b of the shafts 37 and 75. Ends 37a and 75a are seen in FIGS. 5 and 7 and are threaded. The bearing retainer 55 is against the other side of the bearing 53 and therefore holds the outer race 53a to the trap door 49. The nut 56 locks the inner race 53b to the shaft.

As can be seen in FIG. 14, the shafts 37 and 75 are suitably mounted in the housing 28 and trap door 49. One end of the shafts 37 and 75 are rotatably mounted in the housing. The shaft 37 is mounted at its one end and extends through the gear 29 and at its other end is positioned in the trap door 49 and supported by bearing 53. Similarly, the shaft 75 is supported at one end in the housing with a suitable bearing 81. At its other end, the shaft 75 is supported by bearing 53 that is positioned in the trap door 49, as previously described. The first through sixth gears and first through sixth countergears are all mounted on the shafts 37 and 75 respectively.

In operation, as is well known in the art, when the shifter weldment 74 is moved, this rotates the shift drum 12. The pins 45p-47p move laterally in their respective cam tracks 12a-12c. This lateral movement of the pins 45p-47p results in lateral movement of the shift forks 45 through 47. The movement of shift fork 45 will be described in more detail, it being understood that the movement of the shift forks 46 and 47 are similar and that it is the design of the cam tracks 12a-12c that determines which shift forks are moving laterally as the shift drum 12 rotates.

Assuming the transmission 100 is in fifth gear, the splines 30c are engaged between the teeth 34a of the fifth gear 34. Then, as the shift drum 12 rotates, the shift fork 45 is moved laterally to the left. This carries the shift collar 30 to the left and the splines 30c becomes disengaged from between the teeth 34a and move to the left to become engaged with the teeth of sixth gear 29a. The shift collar 30 also moves laterally with respect to the sleeve 32, which is tied to the rotation of the shaft 37 by splines 32a. The width of the collar 30 is wider than that of the sleeve 32. Therefore, the shift collar 30 is always splined to the sleeve 32, whether the shift collar 30 is in engagement with the fifth gear 34 or the sixth gear 29a. The ring 30a protrudes from the shift collar 30 and provides for better lubrication. As can be seen by viewing the figures, there is one shift collar 30 that moves between the fifth gear 34 and sixth gear 29a. Another shift collar 30 moves between third gear 38 and fourth gear 39. The third shift collar 30 is moved between the first countergear 78 and second countergear 77. The fifth gear 34, sixth gear 29a, third gear 38 and fourth gear 39 are free to rotate on the shaft 37. They are not driven by the shaft 37 unless engaged by the collar 30. The first gear 37a and second gear 36 are tied to the shaft 37 and will rotate with the shaft 37. The first countergear 78 and second countergear 77 are free to rotate on the shaft 75. The other four countergears are tied to the shaft 77.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A motorcycle transmission, comprising:
   (a) a shaft mounted for rotation in a transmission housing, the shaft having a first end supported in the housing and a second end supported proximate a trap door;
   (b) a plurality of gears rotatably mounted on the shaft;
   (c) a countershaft mounted for rotation in the transmission housing, the countershaft having a first end supported in the housing and a second end supported proximate the trap door;

(d) a plurality of counter gears rotatably mounted on the countershaft;
(e) the trap door having a cylindrical surface forming a bore;
(f) a flange operatively connected to the trap door proximate a first end of the cylindrical surface, the flange defining a stop;
(g) a bearing having an inner race, an outer race, a first side and a second side, the bearing positioned with a first side proximate the flange;
(h) a threaded surface formed in the cylindrical surface proximate a second end of the cylindrical surface; and
(i) a retainer having a threaded outer surface sized and configured to be connected to the cylindrical surface's threaded surface, wherein when threaded, the retainer holds in place the outer race from the second side.

2. The motorcycle transmission of claim 1, further comprising:
(a) the shaft having a threaded surface;
(b) the retainer having a central opening; and
(c) a nut adapted and configured to fit in the central opening, wherein when the nut is threaded on the threaded surface of the shaft, the nut locks the inner race to the shaft.

3. The motorcycle transmission of claim 2, further comprising the gears and counter gears are helical.

4. The motorcycle transmission of claim 3, further comprising:

(a) a shift collar carried on the shaft;
(b) a ring protruding from the outer surface and extending around the outer surface;
(c) a shift fork having a first end and a second end; and
(d) the first end having a first groove and the second end having a second groove, the grooves adapted and configured to mate with the ring, wherein lateral movement of the shift fork results in lateral movement of the shift collar.

5. The motorcycle transmission of claim 4, further comprising a middle groove formed in the fork between the first and second ends, the middle groove adapted and configured to mate with the ring.

6. The motorcycle transmission of claim 4, further comprising:
(a) the gears including at least a first gear and a second gear each having a hub, the hubs rotatably mounted on the shaft;
(b) the hubs having a plurality of teeth operatively connected around the hub;
(c) a shift collar mounted on the shaft for lateral movement thereon;
(d) the shift collar having an inner bore, the bore having a plurality of splines, the splines adapted and configured to engage the hubs between the teeth of the hubs.

* * * * *

UNITED STATES PATENT AND TRADEMARK OFFICE
CERTIFICATE OF CORRECTION

PATENT NO.       : 7,581,467 B2
APPLICATION NO.  : 11/483141
DATED            : September 1, 2009
INVENTOR(S)      : Peterman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this

Fourteenth Day of September, 2010

David J. Kappos
*Director of the United States Patent and Trademark Office*